United States Patent
Kim et al.

(10) Patent No.: US 10,728,318 B2
(45) Date of Patent: Jul. 28, 2020

(54) METHODS AND APPARATUS FOR SELECTION OF CONTENT DELIVERY NETWORK (CDN) BASED ON USER LOCATION

(71) Applicant: Samsung Electronics Co., Ltd., Gyeonggi-do (KR)

(72) Inventors: Jun-Hyung Kim, Gyeonggi-do (KR); Sung-Oh Hwang, Gyeonggi-do (KR); Ji-Eun Keum, Gyeonggi-do (KR); Ho-Yeon Park, Seoul-si (KR); Bo-Sun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/722,366

(22) Filed: Oct. 2, 2017

(65) Prior Publication Data
US 2018/0027065 A1    Jan. 25, 2018

Related U.S. Application Data

(63) Continuation of application No. 12/627,888, filed on Nov. 30, 2009, now Pat. No. 9,781,197.

(51) Int. Cl.
| | |
|---|---|
| *G06F 15/16* | (2006.01) |
| *H04L 29/08* | (2006.01) |
| *G06F 16/435* | (2019.01) |
| *H04L 29/06* | (2006.01) |

(52) U.S. Cl.
CPC ........ *H04L 67/1021* (2013.01); *G06F 16/435* (2019.01); *H04L 65/1006* (2013.01); *H04L 67/18* (2013.01); *H04L 67/306* (2013.01)

(58) Field of Classification Search
CPC .................................. H04L 67/1021
USPC ......................................................... 709/217
See application file for complete search history.

(56) References Cited

U.S. PATENT DOCUMENTS

| | | | |
|---|---|---|---|
| 2002/0065899 | A1 | 5/2002 | Smith et al. |
| 2003/0149581 | A1 | 8/2003 | Chaudhri et al. |
| 2003/0229682 | A1* | 12/2003 | Day ................. H04L 29/06 709/219 |
| 2004/0252683 | A1 | 12/2004 | Kennedy et al. |
| 2005/0021769 | A1 | 1/2005 | Kim et al. |
| 2005/0232229 | A1 | 10/2005 | Miyamoto et al. |

(Continued)

FOREIGN PATENT DOCUMENTS

| | | |
|---|---|---|
| EP | 2 148 505 | 1/2010 |
| EP | 2 262 199 | 12/2010 |

(Continued)

OTHER PUBLICATIONS

Korean Office Action dated Jun. 9, 2016 issued in counterpart application No. 10-2010-0116081, 11 pages.

*Primary Examiner* — Hamza N Algibhah
(74) *Attorney, Agent, or Firm* — The Farrell Law Firm, P.C.

(57) ABSTRACT

Methods and apparatus are provided for providing a content service of a control device. A first request related to a content service is received. First information for a location corresponding to the first request and second information for a session corresponding to the first request are acquired based on the first request. A second request is transmitted to a content delivery network (CDN) identified based on the first information and the second information, based on the first request.

18 Claims, 8 Drawing Sheets

(56) References Cited

U.S. PATENT DOCUMENTS

| | | |
|---|---|---|
| 2006/0294244 A1 | 12/2006 | Naqvi et al. |
| 2007/0067470 A1* | 3/2007 | Ayers .................... H04L 67/16 709/230 |
| 2007/0118604 A1 | 5/2007 | Costa Requena |
| 2007/0208804 A1 | 9/2007 | Berna Fornies et al. |
| 2007/0242659 A1* | 10/2007 | Cantu ................. H04M 11/007 370/352 |
| 2007/0270164 A1 | 11/2007 | Maier et al. |
| 2008/0065775 A1* | 3/2008 | Polk .................... H04L 61/2015 709/228 |
| 2008/0140800 A1 | 6/2008 | Farber et al. |
| 2008/0162705 A1* | 7/2008 | Cai ........................ H04W 8/20 709/228 |
| 2008/0168165 A1* | 7/2008 | Araki ................... H04L 67/306 709/223 |
| 2008/0176582 A1 | 7/2008 | Ghal et al. |
| 2008/0215718 A1 | 9/2008 | Stolorz et al. |
| 2008/0215755 A1 | 9/2008 | Farber et al. |
| 2008/0243602 A1 | 10/2008 | Foti |
| 2008/0261557 A1* | 10/2008 | Sim ........................ H04W 4/02 455/404.2 |
| 2009/0027191 A1* | 1/2009 | Farah .................... H04W 4/02 340/539.13 |
| 2009/0064218 A1 | 3/2009 | Yamagishi |
| 2009/0125628 A1* | 5/2009 | Dahlen ................. H04L 67/16 709/227 |
| 2009/0144412 A1 | 6/2009 | Ferguson et al. |
| 2009/0147779 A1 | 6/2009 | Foti |
| 2009/0180614 A1 | 7/2009 | Rajagopal et al. |
| 2009/0181651 A1* | 7/2009 | Klassen ............ H04M 1/72547 455/414.1 |
| 2009/0190577 A1* | 7/2009 | Allen .................. H04L 65/1016 370/352 |
| 2009/0191873 A1* | 7/2009 | Siegel ................. H04L 29/1216 455/435.2 |
| 2009/0241162 A1 | 9/2009 | Lee |
| 2009/0254661 A1 | 10/2009 | Fullagar et al. |
| 2009/0285162 A1 | 11/2009 | Xie et al. |
| 2009/0325592 A1 | 12/2009 | Jang et al. |
| 2009/0327079 A1* | 12/2009 | Parker .................... G06Q 30/02 705/14.55 |
| 2010/0056185 A1 | 3/2010 | Lamba |
| 2010/0077017 A1* | 3/2010 | Martinez ................ H04L 67/18 709/201 |
| 2010/0125675 A1 | 5/2010 | Richardson et al. |
| 2010/0159952 A1 | 6/2010 | Hanson et al. |
| 2010/0161760 A1 | 6/2010 | Maloo |
| 2010/0203903 A1* | 8/2010 | Dingler .................. H04W 4/02 455/456.5 |
| 2010/0208648 A1* | 8/2010 | Narkar .................... H04W 4/18 370/328 |
| 2010/0223660 A1* | 9/2010 | Scott ................. H04N 21/2541 726/4 |
| 2010/0262683 A1 | 10/2010 | Gerber et al. |
| 2011/0019567 A1 | 1/2011 | Jiao et al. |
| 2011/0035780 A1 | 2/2011 | Cedervall et al. |
| 2011/0064205 A1* | 3/2011 | Boni ...................... H04M 11/04 379/45 |
| 2011/0064219 A1 | 3/2011 | Edlund et al. |
| 2011/0078327 A1* | 3/2011 | Li ...................... H04L 29/12066 709/238 |
| 2011/0111734 A1* | 5/2011 | Walker .................... H04L 67/16 455/414.1 |
| 2011/0119145 A1 | 5/2011 | Neuwirt et al. |
| 2011/0119370 A1 | 5/2011 | Huang et al. |
| 2011/0197238 A1 | 8/2011 | Li et al. |
| 2011/0209188 A1 | 8/2011 | Petersson et al. |
| 2012/0011273 A1 | 1/2012 | Van Elburg et al. |
| 2012/0023530 A1 | 1/2012 | Xia |
| 2013/0090974 A1 | 4/2013 | Braun et al. |

FOREIGN PATENT DOCUMENTS

| | | |
|---|---|---|
| JP | 4264016 | 5/2009 |
| KR | 1020020017926 | 3/2002 |
| KR | 1020090019446 | 2/2009 |

* cited by examiner

FIG. 3

```
--boundary1
<?xml version="1.0" encoding="UTF-8"?>
<xs:schema xmlns:tns="urn:oipf:CoDService:2009" xmlns:xs="http://www.w3.org/2001/XMLSchema"
    targetNamespace="urn:oipf:CoDService:2009" elementFormDefault="qualified"
    attributeFormDefault="unqualified">
<xs:element name="CoDService">
<xs:complexType>
<xs:sequence>
<xs:element name="UALocation" type="tns:ctUALocation"/>
</xs:sequence>
</xs:complexType>
</xs:element>
<xs:complexType name="ctUALocation">
<xs:choice>
<xs:element name="BSID" type+"xs:string"/>
<xs:element name="GeoCoordinate" type="tns:ctGeoCoordinate" />
</xs:choice>
</xs:complexType>
<xs:complexType name="ctGeoCoordinate">
<xs:sequence>
<xs:element name="latitude" type="xs:double"/>
<xs:element name="longitude" type="xs:double"/>
</xs:sequence>
</xs:complexType>
</xs:schema>
```

METHODS AND APPARATUS FOR SELECTION OF CONTENT DELIVERY NETWORK (CDN) BASED ON USER LOCATION

PRIORITY

This application is a Continuation application of U.S. application Ser. No. 12/627,888, which was filed in the U.S. Patent and Trademark Office on Nov. 30, 2009, the contents of which is incorporated herein by reference.

BACKGROUND OF THE INVENTION

1. Field of the Invention

The present invention relates generally to content providing services, and more particularly, to the selection of a Content Delivery Network (CDN) based on user location.

2. Description of the Related Art

As Internet Protocol (IP)-based communication services and IP-based broadcast services converge, opportunities are emerging for the development of new business models and services in the industry. An example of a technology that clearly illustrates this convergence is IP Television (TV) technology, which provides conventional TV, voice and information services. Specifically, IPTV technology provides flexible communication and broadcast services to fixed terminals, such as set-top boxes, Personal Computers (PCs) and TV sets, as well as to mobile devices, such as mobile phones, Personal Digital Assistants (PDAs) and laptop computers. The flexible communication and broadcast services may be provided in any environment using wired, wireless and broadcast networks.

IPTV services may be classified into an Open Internet model or an IP Multimedia Subsystem (IMS)-based Managed model. In an IMS-based Managed model, a Call/Session Control Function (CSCF) server selects an appropriate application server in response to a user's service request message based on user information. The service request message is then forwarded to the selected application server.

Referring initially to FIG. 1, a diagram illustrates a network for providing an IMS-based IPTV service. A user 102 (also referred to as a User Equipment (UE) or a User Agent (UA)) sends a service request message to an IPTV controller 104. Specifically, in the IMS-based IPTV service, the service request message is a Content on Demand (CoD) service request message. The IPTV controller 104 retrieves user profile information corresponding to the user 102 from a server 106 that manages user profiles. The IPTV controller 104 performs an authentication process for the user and the requested service based on the retrieved user profile information. If the user 102 and the requested service are successfully authenticated, the IPTV controller 104 selects a Media Control Function (MCF) module 110 and a corresponding CDN 108 from a plurality of CDNs (CDN1, CDN2, CDN3) based on predetermined criteria in the user profile information. The IPTV controller 104 forwards the service request message to the selected MCF module 110.

Typically, a default CDN to be utilized in delivery of a service to the user is defined when the user registers with the IMS network, and is stored in the user profile information. Thus, the service request message is forwarded to the default CDN stored in the user profile information absent any specific user request to the contrary.

The MCF module 110 selects a Media Delivery Function (MDF) module 112 having the content requested by the user 102 in the CoD service request message, from a plurality of MDF modules (MDF1, MDF2) in the CDN 108. The MDF module 112 functions as a server that delivers the content to the user. The MCF module 110 may utilize various selection criteria in selecting the MDF module 112. For example, the MDF module 112 may be selected in accordance with at least one of a policy of the service provider, a general traffic load, and a user location. The selection of the MDF module 112 based on user location can be implemented as set forth by the service provider. After the MCF module 110 selects the MDF module 112, a connection between the user 102 and the MDF module 112 is established in order to provide the user 102 with a transmission, such as, for example, a CoD transmission.

In order to guarantee high service quality for a CoD service, CoD content that is within a predetermined range of jitter is continuously transmitted to the user 102. As the distance between the MDF module 112 and the user 102 increases, the routing path becomes more complicated. Complicated routing paths cause congestion and an increase in jitter, resulting in a degradation of service quality. The use of user location as a criterion in MDF module selection attempts to minimize the transmission distance to the user 102.

A conventional MCF module selects an MDF module closest to a user from among the MDF modules under the control of the MCF module. However, because the MDF module is selected based on location information preset by the service provider, conventional MDF module selection does not take into account the mobility of the user and cannot guarantee that the selected MDF module is the MDF module in the CDN that is closest to a current location of the user. Further, the selection of the MCF module and corresponding CDN does not consider user location information. Thus, it is possible that an MDF module of another CDN is actually closest to the current location of the user.

SUMMARY OF THE INVENTION

The present invention has been made to address at least the above problems and/or disadvantages and to provide at least the advantages described below. Accordingly, an aspect of the present invention provides methods and apparatus for selecting a CDN for IP-based services.

According to one aspect of the present invention, a method is provided for providing a content service of a control device. A first request related to a content service is received. First information for a location corresponding to the first request and second information for a session corresponding to the first request are acquired based on the first request. A second request is transmitted to a content delivery network (CDN) identified based on the first information and the second information, based on the first request.

According to an additional aspect of the present invention, a control device is provided for providing a content service. The control devices includes a transceiver configured to transmit and receive signals, and a controller coupled with the transceiver. The controller is configured to receive a first request related to a content service, and acquire first information for a location corresponding to the first request and second information for a session corresponding to the first request based on the first request. The controller is also configured to transmit, to a CDN identified based on the first information and the second information, a second request based on the first request.

According to a further aspect of the present invention, a method is provided for providing a content service of a terminal. A first request related to a content service is transmitted to a control device. The content service is received, from a CDN, based on the first request. First information for a location corresponding to the first request and second information for a session corresponding to the first request is acquired based on the first request. The CDN is identified based on the first information and the second information and a second request is transmitted to the CDN based on the first request.

According to another aspect of the present invention, a terminal is provided for providing a content service. The terminal includes a transceiver configured to transmit and receive signals, and a controller coupled with the transceiver. The controller is configured to transmit, to a control device, a first request related to a content service, and receive, from a CDN, the content service based on the first request. First information for a location corresponding to the first request and second information for a session corresponding to the first request is acquired based on the first request. The CDN is identified based on the first information and the second information and a second request is transmitted to the CDN based on the first request.

BRIEF DESCRIPTION OF THE DRAWINGS

The above and other aspects, features and advantages of the present invention will be more apparent from the following description when taken in conjunction with the accompanying drawings, in which:

FIG. 3 is a table showing a newly defined schema for CDN selection based on user location, according to an embodiment of the present invention;

DETAILED DESCRIPTION OF EMBODIMENTS OF THE PRESENT INVENTION

Figure 1:
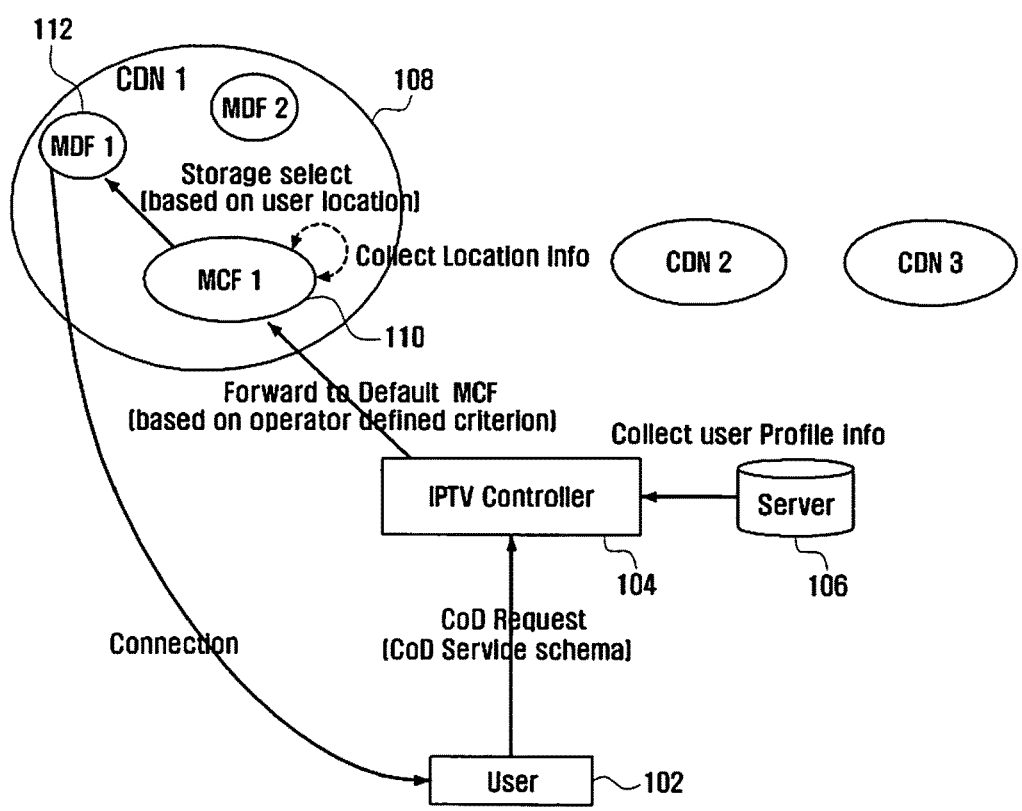
FIG. 1 is a diagram illustrating a network for providing an IMS-based IPTV service.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Figure 2:
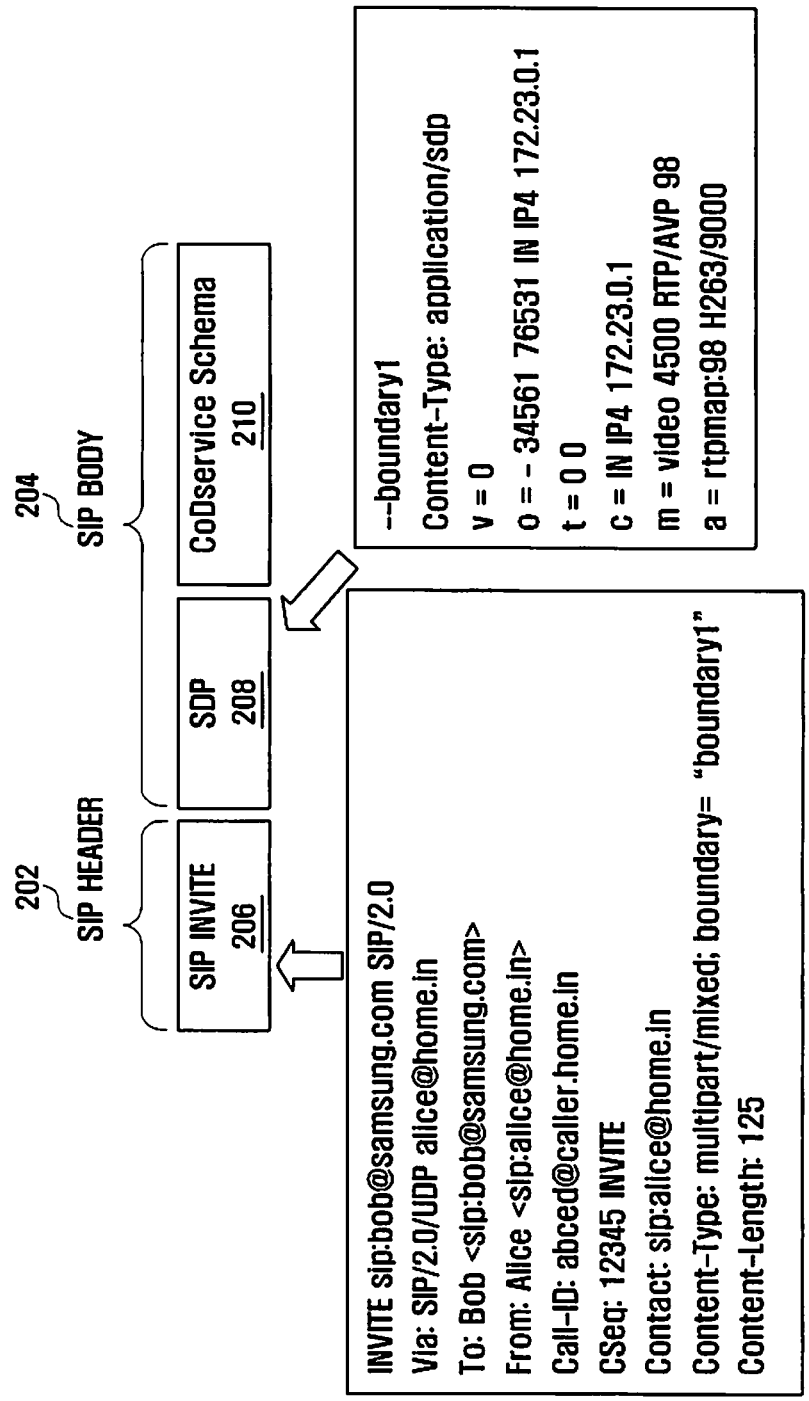
FIG. 2 is a diagram illustrating a format of a CoD service request message in which CDN selection is based on user location, according to an embodiment of the present invention.

Referring to FIG. 2, a diagram illustrates a format of a CoD service request message in which CDN selection is based on user location, according to an embodiment of the present invention.

In the conventional content providing method described above, the user equipment transmits a Session Initiation Protocol (SIP) message having an SIP header 202 and an SIP body 204 to the service provider network as a CoD service request message. The SIP header 202 contains an SIP Invite 206, as shown in FIG. 2. The SIP Invite 206 provides information relating to, for example, the sender, the recipient, the content-type and the content-length. The SIP body 204 contains a Session Description Protocol (SDP) payload 208, as shown in FIG. 2. The service provider network recognizes the SDP payload 208 by checking the Content-Type field of the SIP header 202 and obtains information about the content that is requested by the user. However, in the conventional method, the network is unable to acquire information on user location from the SIP-based CoD service request message.

In accordance with an embodiment of the present invention, a new schema, CoDserviceSchema 210, is also provided in the SIP body 204 of the CoD service request message. CoDserviceSchema 210 is defined, according to an embodiment of the present invention, as shown in FIG. 3. The schema of FIG. 3 defines two types of elements that may provide user location information. First, a geocoordinate element may be provided for a device equipped with a Global Positioning System (GPS) module. The geocoordinate element expresses precise location information in terms of latitudinal and longitudinal coordinates. Second, a Base Station Identifier (BSID) element may be provided for a device that does not have a GPS module. The BSID element expresses location information using information of an Access Point (AP) or a Base Station (BS) that provides the user with Internet access.

Figure 4:
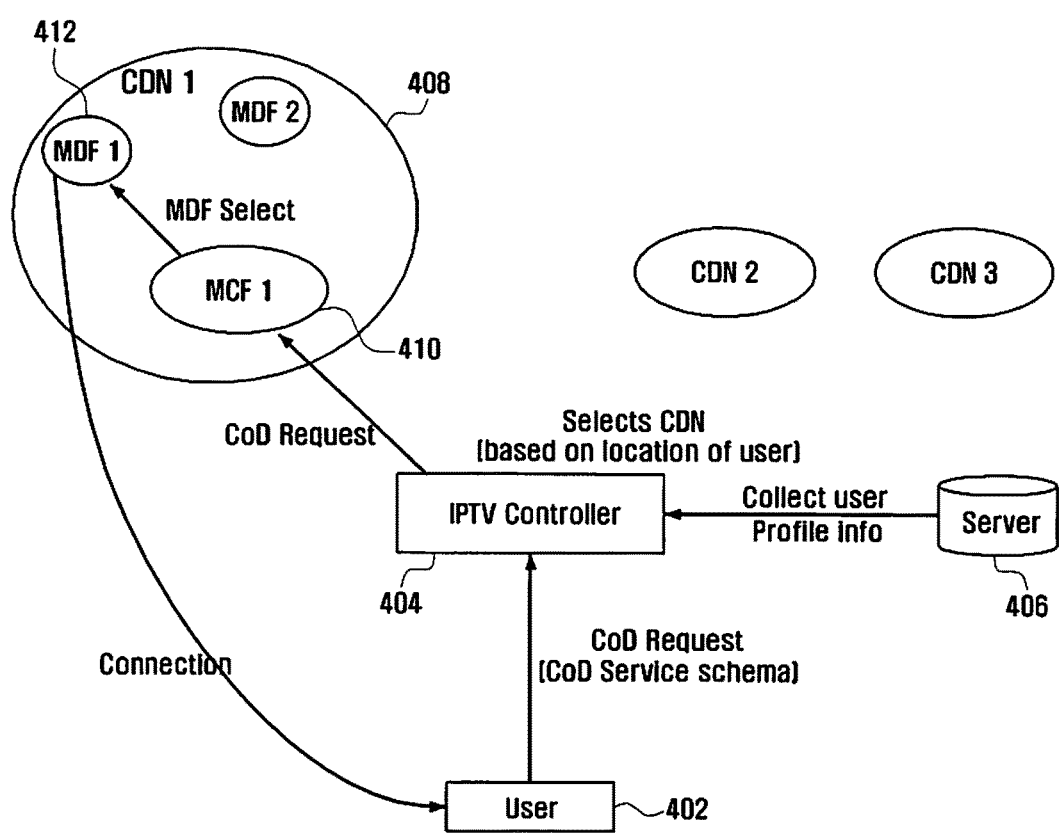
FIG. 4 is a diagram illustrating a network for providing an IMS-based IPTV service in which CDN selection is based on user location, according to an embodiment of the present invention.

Referring now to FIG. 4, a diagram illustrates a network for providing an IMS-based IPTV service in which CDN selection is based on user location, according to an embodiment of the present invention.

A user 402 sends a CoD service request message to an IPTV controller 404 in order to receive a CoD service. The CoD service request message contains information on the user's location, as described above with respect to FIGS. 2 and 3. Upon receipt of the CoD service request message, the IPTV controller 404 retrieves a user profile stored in a server 406 that corresponds to the user 402. The retrieved user profile is used by the IPTV controller 404 to authenticate the user 402 for the service requested, which is extracted from an SDP payload of the CoD service request message. The IPTV controller 404 recognizes the CoDserviceSchema payload in an SIP body of the CoD service request message by referencing a Content-Type field of an SIP header of the CoD service request message. The IPTV controller 404 extracts information related to user location from the CoDserviceSchema and forwards the CoD service request message to an MCF module 410 of a corresponding CDN 408 in accordance with the requested service information and the user location information. According to an embodiment of the present invention, the CoD service request message is forwarded to a CDN 408 of a plurality of CDNs (CDN1, CDN2, CDN3) that is closest to the user location information. The MCF module 410 of CDN 408 also utilizes the user location information of the CoD service request message to forward the CoD service request message to an MDF module 412 of a plurality of MDF modules (MDF1, MDF2) in the CDN 408 that is closest to the user location information.

Figure 5:
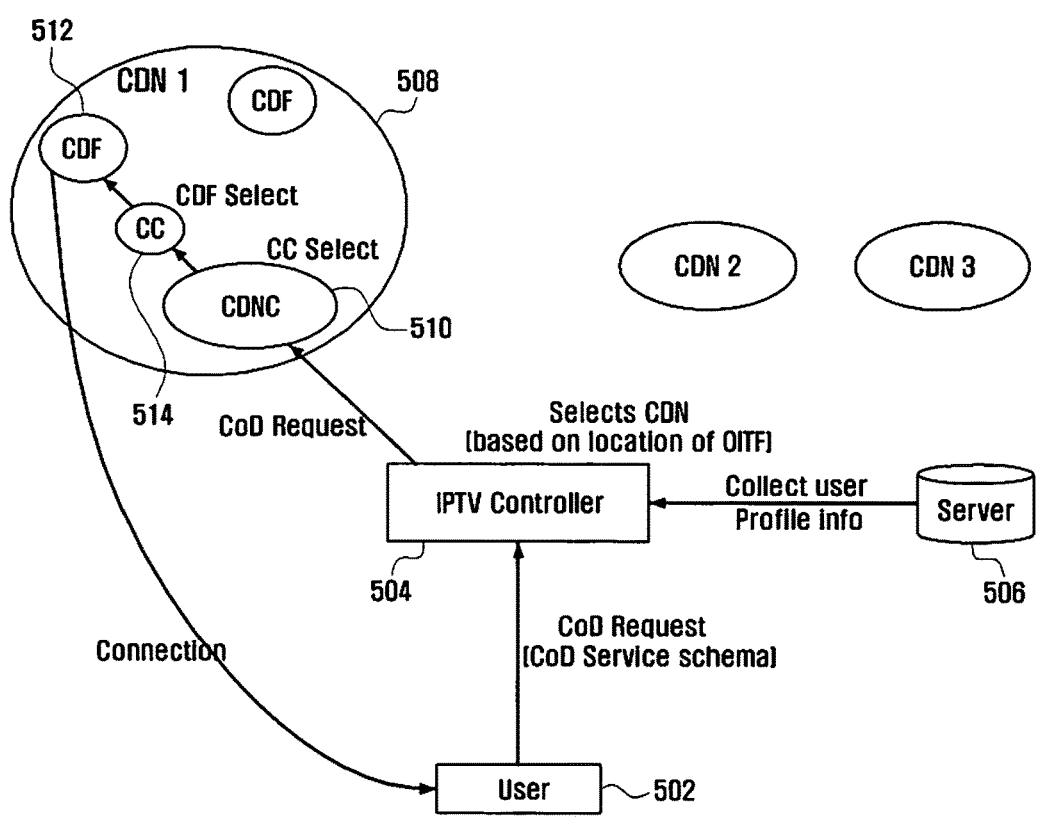
FIG. 5 is a diagram illustrating a network for providing an IPTV service in which CDN selection is based on user location, according to another embodiment of the present invention.

FIG. 5 is a diagram illustrating a network for providing an IPTV service in which CDN selection is based on user location, according to another embodiment of the present invention. The network of FIG. 5 is similar to that of FIG. 4, except the names of the functional elements reflect those of Open IPTV Form standards. For example, User 502, IPTV controller 504, and server 506 function in a manner similar to that of their respective elements in FIG. 4. FIG. 5 also illustrates a CDN Controller (CDNC) 510, a Cluster Controller (CC) 514 and a plurality of Content Delivery Function (CDF) modules 512 in each CDN 508. In selecting the closest CDF to the user, the CDNC 510 first utilizes the user location information in the CoD service request message to select the CC 514 closest to the user location information. The CC 514 also utilizes the user location information to select the CDF 512 closest to the user location information.

Figure 6:
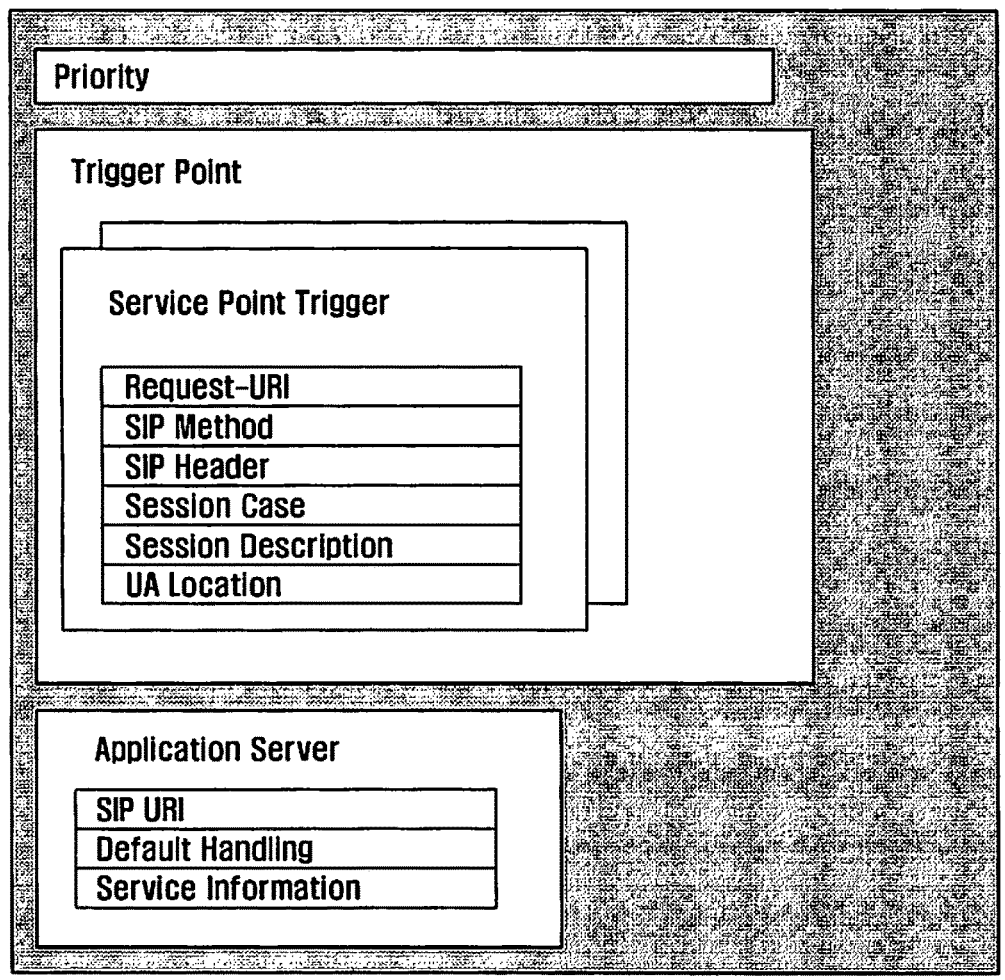
FIG. 6 is a diagram illustrating an initial Filter Criteria (iFC) of a user profile for use in CDN selection based on user location, according to an embodiment of the present invention.

Referring now to FIG. 6, a diagram illustrates an iFC contained in a user profile for use in CDN selection based on user location, according to an embodiment of the present invention. The iFC is used as a criterion for forwarding the service request message from the user to an appropriate CDN. The iFC is composed of priority, trigger point and application server information. The priority information determines the order in which the filter criteria will be assessed and then compared with the remaining iFC that are part of the same service profile. The trigger point information is evaluated in order to determine whether the SIP request will be forwarded to a particular application server. Trigger point information includes one or more service point triggers. 'Request-URI' indicates a type of service that a user wants to receive. 'SIP Method' indicates a type of SIP message, such as, for example, INVITE, OPTION, SUBSCRIBE, etc. 'Session Case' indicates whether the SIP request is originated by the served user, addressed to the served registered user, or addressed to the served unregistered user. 'Session Description' is any partial or full SDP in the SIP body. 'UA Location' describes the location of a user initiating the service. The application server is composed of 'SIP URI', 'Default Handling' and 'Service Information'. 'SIP URI' is the address of the application server that will receive the SIP request if the conditions described in the trigger point are met. In the embodiment of the present invention, SIP URI is an MCF. 'Default Handling' indicates the action that will be taken if the IPTV control cannot contact the application server. 'Service Information' contains data that the application server may need to process the request.

In an embodiment of the present invention, user location is one of the defined criteria, or filtering parameters, in a Service Point Trigger of the iFC. When a service request message is received, the IPTV controller extracts the iFC from the user profile to select an appropriate MCF module and a corresponding CDN by filtering the user location information and the service information of the service request message through the iFC.

Figure 7:
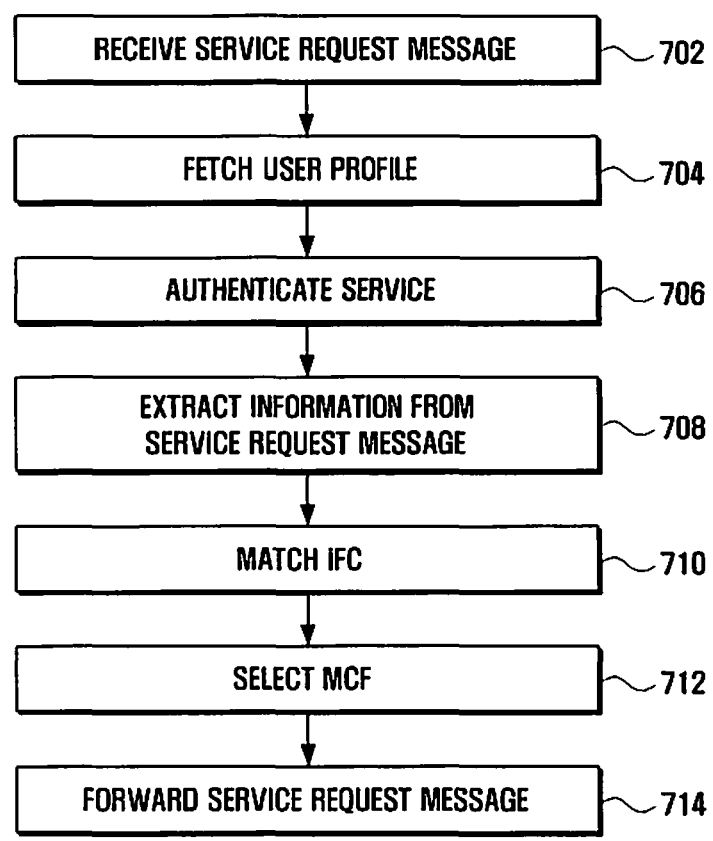
FIG. 7 is a flow diagram illustrating an MCF module selection methodology based on user location information extracted from a CoD service request message, according to an embodiment of the present invention.

FIG. 7 is a flow diagram illustrating an MCF module selection methodology based on user location information extracted from the CoD service request message, according to an embodiment of the present invention. The methodology begins in step 702 where a service request message is received from the user at the IPTV controller. In step 704, a corresponding user profile is retrieved from the server. In step 706, the requested service is extracted from the service request message and the user is authenticated for the requested service in accordance with the user profile. In step 708, location information is extracted from the service request message. In step 710, the extracted service and location information are filtered through an iFC extracted from the user profile. For example, in a specific iFC, a session description filtering parameter of the Service Point Trigger of the iFC is set to video, the user location is set to Zone A, and the SIP Uniform Resource Identifier (URI) value of the application server is set to sip.CodServerA@example.com. If the session description information and location information extracted from the header and the body of the service request message indicate video type and Zone A, respectively, the service request message is forwarded to sip.CodServerA@example.com, as indicated by the SIP URI of the iFC. Thus, in step 712, the MCF module is selected in accordance with the extracted information and the iFC, and in step 714, the service request message is forwarded from the IPTV controller to the selected MCF module.

Figure 8:
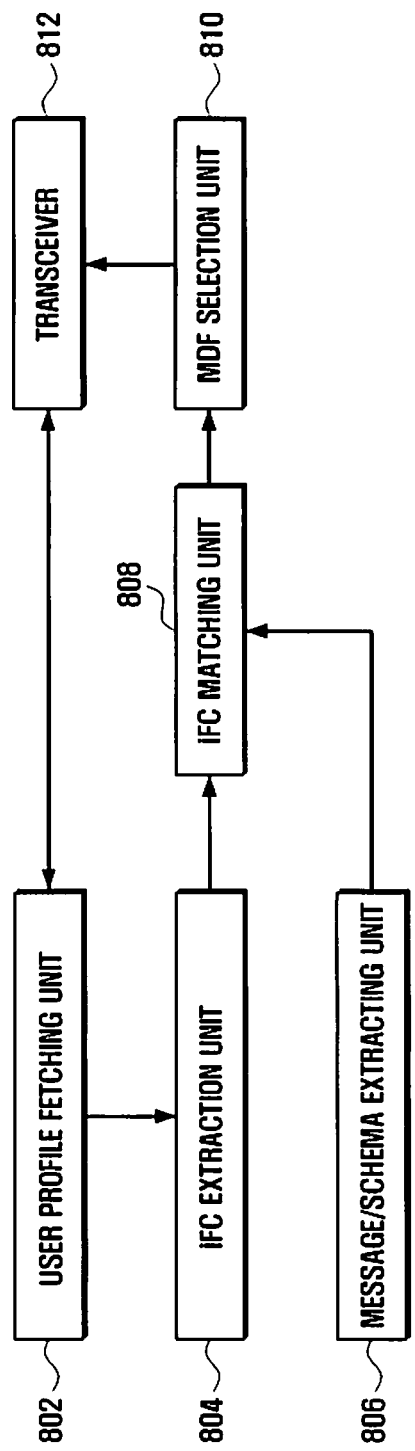
FIG. 8 is a block diagram illustrating an IPTV controller configuration for supporting CDN selection based on user location, according to an embodiment of the present invention.

Referring now to FIG. 8, a block diagram is provided illustrating a configuration of an IPTV controller that supports CDN selection based on user location, according to an embodiment of the present invention. The IPTV controller includes a user profile fetching unit 802, an iFC extraction unit 804, a message/schema extraction unit 806, an iFC matching unit 808, an MDF module selection unit 810, and a transceiver 812.

The user profile fetching unit 802 retrieves a user profile corresponding to a user that sent a service request message that was received at the IPTV controller via the transceiver 812. The iFC extraction unit 804 extracts an iFC from the retrieved user profile. The message/schema extraction unit 806 extracts service information and user location information from the service request message. The iFC matching unit 808 filters the extracted service and user location information through the extracted iFC. The MDF module selection unit 810 selects an appropriate MDF module and a corresponding CDN based on the filtering result, and forwards the service request message to the selected MDF module via the transceiver 812.

As described above in embodiments of the present invention, CDN selection based on user location allows a service provider to select the CDN (MCF module) and content storage (MDF module) based on user location. Content may then be provided to the user over the shortest geographic distance. Content may also be provided to the user over the shortest logical distance, such as, for example, the shortest routing path computed in consideration of the network environment. Because the requested content is provided via the shortest distance, it is possible to for the user to receive stable service quality and for the service provider to efficiently manage traffic over the network.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for providing a content service of a control device, the method comprising:
   receiving, by a transceiver of the control device, a first request related to a content service, from a terminal;
   acquiring, by a processor of the control device, first information for a location corresponding to the first request and second information for a session corresponding to the content service based on the first request;
   identifying, by the processor, a content delivery network (CDN) for the content service by comparing the first information and the second information to filter criteria information, wherein the filter criteria information includes a location of a user initiating the content service, a type of service, a type of the first request, and a type of the user originating the first request; and
   transmitting, by the transceiver, a second request to the CDN for the content service,
   wherein the location of the user initiating the content service included in the filter criteria information is used for comparing with the first information for the location corresponding to the first request, and
   wherein the CDN does not include the control device.

2. The method of claim 1, wherein a media delivery function (MDF) of the CDN is identified based on the first information for the location corresponding to the first request.

3. The method of claim 1, wherein the second request includes the first information for the location corresponding to the first request.

4. The method of claim 1, further comprising:
   acquiring user profile information corresponding the first request; and
   certifying the first request based on the user profile information.

5. The method of claim 1, further comprising:
   acquiring the filter criteria information from user profile information corresponding to the first request.

6. The method of claim 5, wherein the filter criteria information further includes priority information for filtering.

7. The method of claim 1, wherein the second information for a session includes a type of content corresponding to the request.

8. The method of claim 1, wherein the CDN is identified based on the first information for the location and a location of the CDN.

9. A control device for providing a content service, the control device comprising:
   a transceiver configured to transmit and receive signals; and
   a processor coupled with the transceiver and configured to:
      receive a first request related to a content service,
      acquire first information for a location corresponding to the first request and second information for a session corresponding to the content service based on the first request,
      identify a content delivery network (CDN) for the content service by comparing the first information and the second information to filter criteria information, wherein the filter criteria information includes a location of a user initiating the content service, a type of service, a type of the first request, and a type of the user originating the first request, and
      transmit a second request to the CDN for the content service,
      wherein the location of the user initiating the content service included in the filter criteria information is used for comparing with the first information for the location corresponding to the first request, and
      wherein the CDN does not include the control device.

10. The control device of claim 9, wherein a media delivery function (MDF) of the CDN is identified based on the first information for the location corresponding to the first request.

11. The control device of claim 9, wherein the second request includes the first information for the location corresponding to the first request.

12. The control device of claim 9, wherein the processor is further configured to:
   acquire user profile information corresponding the first request, and
   certify the first request based on the user profile information.

13. The control device of claim 9, wherein the processor is further configured to acquire the filter criteria information from user profile information corresponding to the first request.

14. The control device of claim 13, wherein the filter criteria information further includes priority information for filtering.

15. The control device of claim 9, wherein the second information for a session includes a type of content corresponding to the request.

16. The control device of claim 9, wherein the CDN is identified based on the first information for the location and a location of the CDN.

17. A method for providing a content service of a terminal, the method comprising:
   transmitting, by a transceiver of the terminal, to a control device, a first request related to a content service; and
   receiving, by the transceiver of the terminal, from a content delivery network (CDN), the content service based on the first request, wherein the CDN does not include the control device,
   wherein first information for a location corresponding to the first request and second information for a session corresponding to the content service is acquired at the control device based on the first request,
   wherein the CDN for the content service is identified at the control device by comparing the first information and the second information to filter criteria information and a second request is transmitted from the control device to the CDN,
   wherein the filter criteria information includes a location of a user initiating the content service, a type of service, a type of the first request, and a type of the user originating the first request, and wherein the location of the user initiating the content service included in the filter criteria information is used for comparing with the first information for the location corresponding to the first request.

18. A terminal for providing a content service, the terminal comprising:
   a transceiver configured to transmit and receive signals; and
   a processor coupled with the transceiver and configured to:
      transmit, to a control device, a first request related to a content service, and
      receive, from a content delivery network (CDN), the content service based on the first request, wherein the CDN does not include the control device,
   wherein first information for a location corresponding to the first request and second information for a session corresponding to the content service is acquired at the control device based on the first request,
   wherein the CDN for the content service is identified at the control device by comparing the first information and the second information to filter criteria information and a second request is transmitted from the control device to the CDN,
   wherein the filter criteria information includes a location of a user initiating the content service, a type of service, a type of the first request, and a type of the user originating the first request, and
   wherein the location of the user initiating the content service included in the filter criteria information is used for comparing with the first information for the location corresponding to the first request.

* * * * *